W. R. SCHWAB.
FEEDING AND MEASURING DEVICE.
APPLICATION FILED NOV. 25, 1911.
1,053,068.
Patented Feb. 11, 1913.
3 SHEETS—SHEET 1.
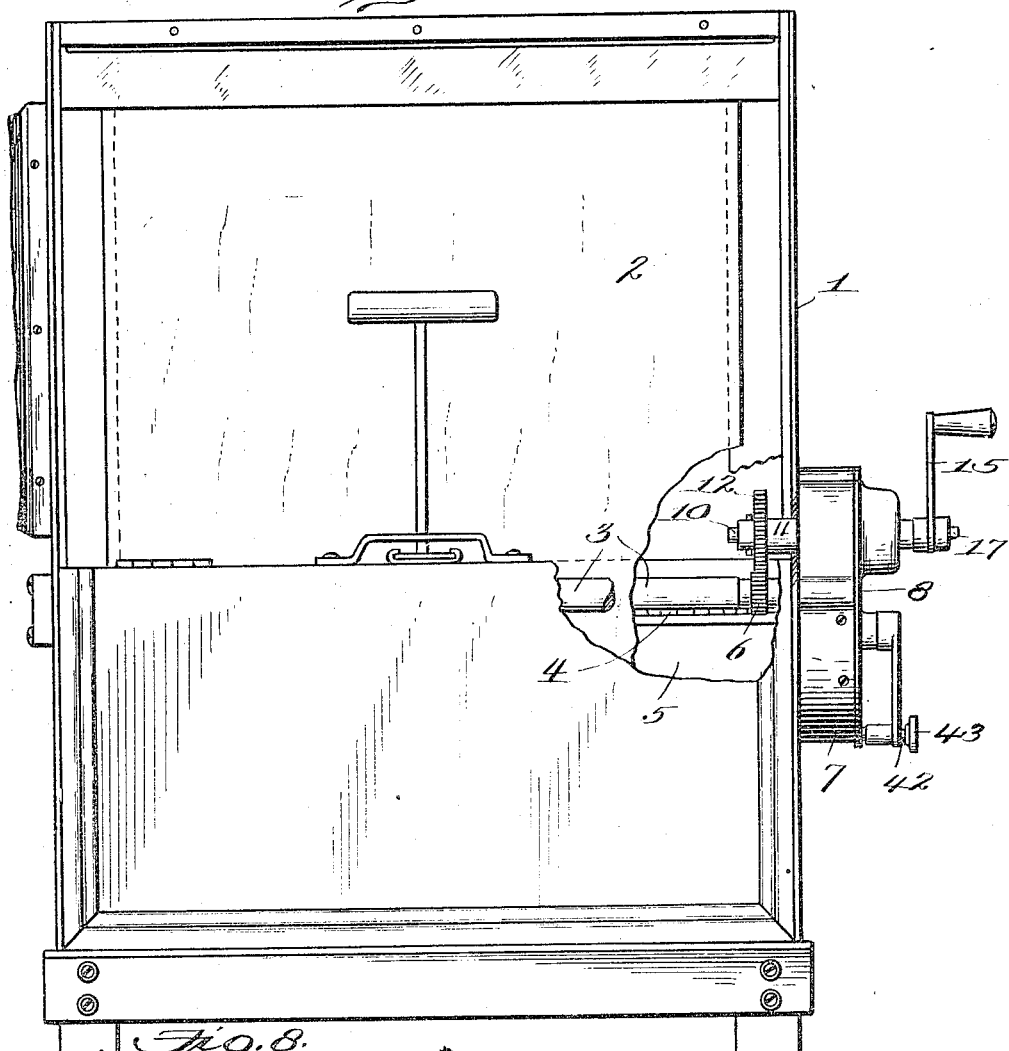
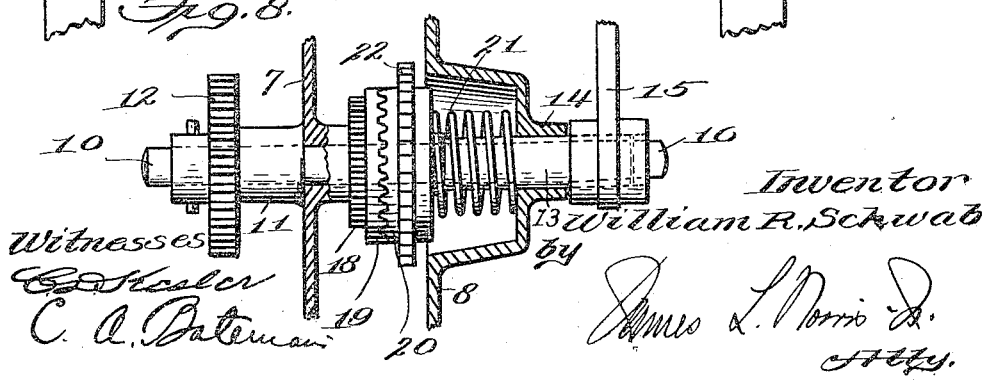
Witnesses
Inventor
William R. Schwab

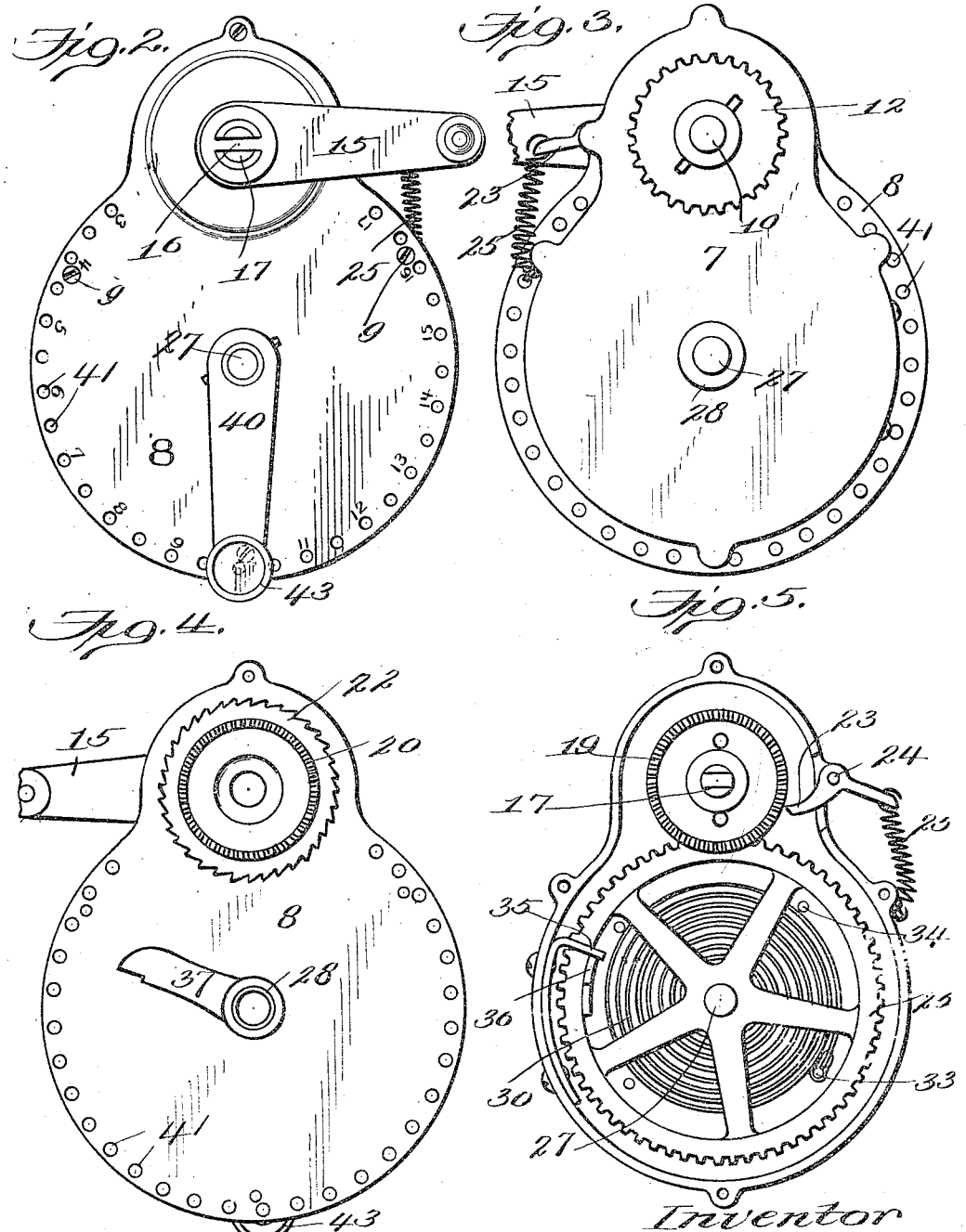

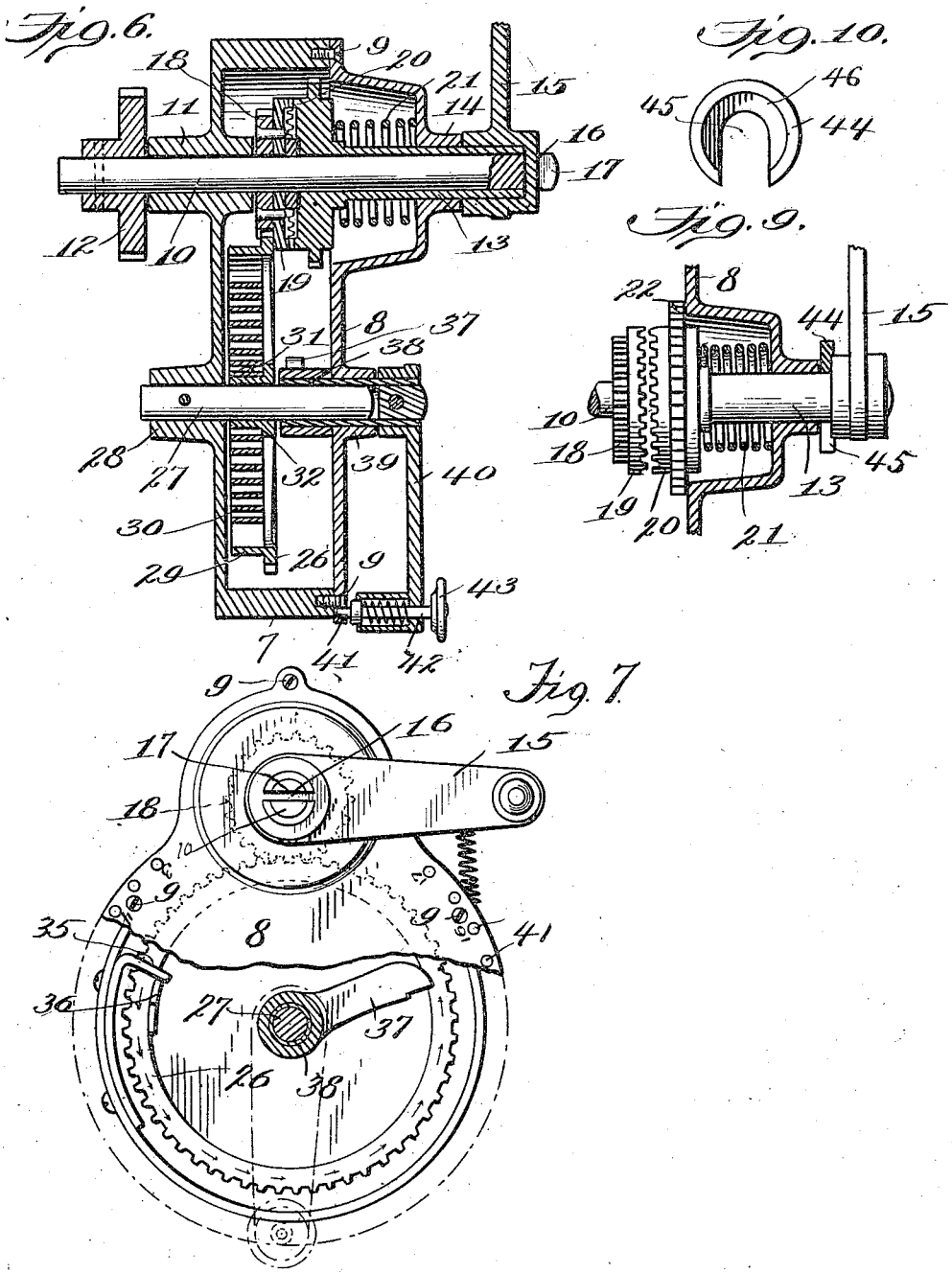

UNITED STATES PATENT OFFICE.

WILLIAM R. SCHWAB, OF KANSAS CITY, MISSOURI, ASSIGNOR TO THE CAMERAGRAPH COMPANY, OF KANSAS CITY, MISSOURI, A CORPORATION OF ARIZONA.

FEEDING AND MEASURING DEVICE.

1,053,068. Specification of Letters Patent. Patented Feb. 11, 1913.

Application filed November 25, 1911. Serial No. 662,478.

*To all whom it may concern:*

Be it known that I, WILLIAM R. SCHWAB, a citizen of the United States, residing at Kansas City, in the county of Jackson and State of Missouri, have invented new and useful Improvements in Feeding and Measuring Devices, of which the following is a specification.

My present invention relates to improvements in devices for feeding measured or graduated lengths or quantities of paper and similar materials and such improvements are especially applicable to apparatus for making photographic prints upon a strip or web of sensitized paper or other appropriate material, an example of such apparatus being shown in Letters Patent No. 929,757 granted August 3, 1909, to C. J. Ellis.

The primary object of the present invention is to provide means whereby the length of paper or sensitized material for each print may be measured according to the desired size of the print and such measuring means may be readily adjusted to vary the length or amount of paper to be fed at each operation whereby uniformity in feed is insured for prints of each size without requiring care and attention from the operator after the measuring means has been appropriately set.

Further objects of the invention are to provide in a measuring device of this character means whereby the device may be quickly and immediately reset after each feeding and measuring operation and to enable the feeding means to be operated independently of the measuring means.

To these and other ends, the invention consists in certain improvements, and combinations and arrangements of parts, all as will be hereinafter more fully described, the novel features being pointed out particularly in the claims at the end of the specification.

In the accompanying drawings:—Figure 1 is an end elevation, partly in section, of a photographic apparatus equipped with the paper feeding and measuring device constructed in accordance with the present invention; Figs. 2 and 3 are front and rear elevations respectively of the feeding and measuring device; Fig. 4 is a view of the inner side of the face plate of the measuring device; Fig. 5 is a front view of the measuring device with the front or cover plate removed; Fig. 6 represents a central vertical section through the measuring device; Fig. 7 is a front view of the device, partly in section, showing the coöperative stops for limiting the feeding operation; Fig. 8 is a fragmentary sectional view of the upper portion of the feeding and measuring device showing the clutch in engaged condition; Fig. 9 is a view similar to Fig. 8 showing the clutch in disengaged condition and held in such condition by a locking device; Fig. 10 is a detail view of the locking device.

Similar parts are designated by the same reference characters in the several views.

Feeding and measuring devices constructed in accordance with the present invention are capable of use generally in various instances where it is desirable or necessary to feed measured or graduated lengths of paper and other materials. In the present instance the preferred form of feeding and measuring device is shown and it is applied to one form of apparatus whereby measured or graduated lengths of sensitized paper are fed within the apparatus as a part of the process of making photographic prints. It is to be understood, however, that the invention is not necessarily limited to the particular construction shown, nor is its use confined necessarily to apparatus of the particular form referred to.

In the present instance the photographic apparatus to which the invention is applied comprises a casing 1 which contains a supply of sensitized paper or material 2, this material lying in the focal plane of a camera which forms a part of such apparatus, and this strip or web of material is fed to and from the exposing position by a pair of rollers 3, a knife 4 being located below the rollers to sever the strip of paper or material into sections which conform in size to the size selected for the prints, and these severed prints enter a developing tank 5, the feeding of the strip being effected by rotation of the rollers 3 between which the paper passes. One of these rollers is provided with a gear pinion 6 and this gear pinion coöperates with the feeding and measuring device which forms the subject of the present invention.

The feeding and measuring device as shown in the present instance comprises a casing composed of a body section 7 and a removable cover or face plate 8, these sections or parts being secured together by screws 9 Fig. 2 or other suitable means. A shaft 10 extends through a bearing 11 Fig. 6 formed in the rear wall of the section 7 and bears a gear 12 which coöperates with the gear pinion 6 on the feed roll 3, this gear and pinion being maintained in coöperative relation by the casing which is secured by suitable means to the side wall of the machine. The opposite end of the shaft 10 is surrounded by a sleeve 13 which extends through a bearing 14 formed as a part of the cover or face plate 8 and an operating crank 15 is fixed to the outer or exposed end of said sleeve. The sleeve and the crank thereon are capable of axial movement relatively to the shaft 10, but these parts have a spline connection with said shaft which in the present instance comprises a key 16 Fig. 2 which operates in a slot 17 formed in the outer end of the shaft. A gear pinion 18 and a toothed clutch member 19 are revolubly mounted on the shaft 10 and are contained within the casing. The inner end of the axially movable sleeve 13 also embodies a toothed clutch member 20 which is complemental to and coöperative with the clutch member 19. The clutch members 19 and 20 are normally held in engaged relation to form a driving connection between the crank 15 and the pinion 18 by a spring 21 which surrounds the sleeve 13 and bears against the outer side of the clutch member 20. A forward shifting movement of the crank 15, or a movement of this crank to the right in Fig. 6, will disengage the clutch members and thereby interrupt the operative connection between the crank and the pinion 18. Turning of the crank 15 effects the feeding operation of the feed rolls 3 and to prevent retrograde motion of the feed rolls, a ratchet wheel 22 Fig. 9 is preferably formed on the clutch member 20 and a pawl 23 normally coöperates with this ratchet wheel, this pawl being pivoted to the body portion of the casing at 24 Fig. 5 and a spring 25 acts upon the pawl to retain it in engagement with the ratchet wheel.

The pinion 18 which is loose on the shaft 10 but may be operatively connected to this shaft by the engagement of the clutch members 19 and 20 coöperates with a gear 26, the latter being revolubly mounted on a stud shaft 27 which is secured in a boss 28 formed in the rear wall of the casing, and this gear is preferably formed with a drum 29 which contains a coil spring 30, the inner end of this coil spring being attached at 31 to the hub 32 of the gear while the outer or opposite end of this spring is attached to a pin 33 Fig. 5 which is secured in the rear wall of the casing section 7. A suitable number of projections 34 serve to prevent undue expansion of the spring. The spring operates on the gear 26 in a manner to produce a tendency of this gear to rotate in one direction. Rotation of the gear 26 under the action of the spring 30 is limited by a relatively fixed stop 35 which is secured to the casing section 7 and coöperates with a controlling projection 36 which is secured to the gear; the controlling projection 36 on the gear normally resting against the limiting stop 35. The degree of rotation of the gear 26 determines the amount or length of paper or material fed by turning of the crank 15, and according to the present invention, the angle through which the gear 26 rotates may be adjusted or regulated whereby different lengths of paper or material may be fed. The means for limiting rotation of the gear 26 to terminate each feeding operation embodies in the present instance an arm 37 the outer end of which lies in the path of the controlling projection 36 on the gear, it being understood that this controlling projection can operate only within the limits determined by the arm 37 and the limiting stop 35. This arm 37 is mounted on a sleeve 38, the sleeve extending through a bearing 39 formed as a part of the cover or face plate 8, and a crank or handle 40 is fixed to the outer end of the sleeve 38 and is adjustable about the latter as an axis, rotation of the handle 40 serving to set the arm 37 in different adjusted positions. In order to retain the arm 37 in different adjusted positions, the cover or face plate 8 is formed with a set of locking apertures 41 which are concentric with the axis of rotation of the adjusting handle or crank 40, and this handle or crank bears a spring-pressed plunger 42 which is adapted to enter and coöperate with any one of the apertures 41 to thereby lock the handle or crank 40 in the desired position. This spring-pressed plunger has a knob 43 which serves not only to retract the plunger and thereby unlock the handle or crank, but it also serves as means for manipulating the handle or crank 40. The locking apertures 41 are preferably spaced to conform to a scale of inches and fractions thereof so that the spring-pressed plunger on the handle or crank 40 may be engaged in the particular aperture which corresponds to the length of paper to be fed.

In operation, the handle or crank 40 is first set according to the length of paper to be fed at which time the gear 26 will occupy an initial position, that is to say, the controlling projection 36 on this gear will abut against the stationary limiting stop 35. The crank 15 is then turned and as the spring 21 retains the clutch members 19 and 20 in engagement, rotary motion will be transmitted from the crank 15 to the shaft 10 by reason of the spline connection between the crank and shaft, and the gear 12 on this shaft will cause feeding motion of the feed rolls 3. The spring 21 normally retains the clutch members 19 and 20 in engagement and, hence, turning motion of the crank 15 will also be transmitted to the pinion 18, and as this pinion coöperates with the gear 26, the latter will be rotated to a degree corresponding to the degree of rotation imparted to the shaft 10. The feeding motion of the paper due to the turning of the crank 15 may continue until the gear 26 has rotated to a point where the controlling projection 36 thereon abuts against the properly set arm 37 and this terminates the feeding operation. In order to reset the device after one feeding operation and preparatory to the next operation, it is only necessary to pull the crank 15 outwardly or toward the right in Fig. 6, the clutch members 19 and 20 being thereby disengaged and the spring 30 will return the gear 26 to initial position, the gear pinion 18 being at this time disconnected from and loose on the shaft 10.

The present invention also provides means whereby the measuring part of the device may be temporarily rendered inoperative to enable the feed rolls to be rotated continuously or without interruption. In the present instance a locking device in the form of a disk 44 is employed, this disk having a slot 45 therein and the disk is adapted to be inserted between the hub of the crank 15 and the opposed outer end of the bearing 14 while the crank 15 is withdrawn to disconnect the clutch members 19 and 20. While this disk or locking device is so placed, the clutch members 19 and 20 are held in disengaged relation. To prevent the disk or locking device from dropping out of place, it is preferably formed with a recess 46 which is adapted to receive the inner end of the hub on the crank 15, as shown in Fig. 9.

The operation of a feeding and measuring device constructed in accordance with the present embodiment of my invention may be briefly described as follows: The arm 40 to which the adjustable limiting stop 37 is attached is unlocked by withdrawal of the plunger 42 and rotation to a point where this plunger registers with that part of the indicating scale designating the length of material to be fed at each operation. Initially, the stop 36 on the measuring wheel will abut against the stationary stop 35 and the clutch members 19 and 20 will be held in engaged relation by the spring 21. The paper or other material is fed in the present instance by rotation of the feeding member 12 on the shaft 10, such rotation being effected by the crank handle 15. As the clutch member 19 is turned by the clutch member 20 when engaged therewith, the gear or pinion 18 attached to the clutch member 19 will rotate the measuring wheel at a rate proportionate to the operation of the feed member and the feed member may continue to operate to feed the material until the projection 36 on the measuring wheel abuts against the adjustable stop 37 whereupon further feeding operation of the member 12 is prevented. To repeat the feeding and measuring operation, it is only necessary to disengage the clutch members 19 and 20 which can be readily accomplished by moving the crank handle 15 to the right, the clutch members being thereby disengaged and the spring 30 will automatically restore the measuring member to initial position with the projection 36 thereon engaging the stationary stop 35. Reëngagement of the clutch members after their restoring operation is accomplished automatically by the spring 21, and the feeding and measuring operation may be then repeated. By setting the arm 40 in different angular positions, it is obvious that different lengths of paper or other material may be readily fed.

I claim as my invention:—

1. A feeding and measuring device comprising, in combination, a feed member, a measuring member having means adjustable to limit the extent of operation of the feed member to different degrees, operating means connected to the feed member, means controlled by said operating means for connecting and disconnecting the feed and measuring members, and means for restoring the measuring member automatically to initial position when said member is disconnected from the feed member.

2. A feeding and measuring device comprising, in combination, a feed member, an operating device constantly connected thereto, a measuring member, and coöperative relatively adjustable stops for limiting the extent of operation of the same to different degrees, means tending to restore the measuring member to initial position, and means controlled by the operating device for connecting and disconnecting the measuring member to the feed member.

3. A feeding and measuring device comprising in combination a feed member, a measuring member adapted to be restored to initial position after each measuring operation, means for connecting and disconnecting the measuring and feed members, and means operative automatically to restore said measuring member when disconnected from the feed member.

4. A measuring and feeding device comprising in combination a feed member having a handle for operating it, a measuring member for controlling the extent of operation of the feed member and having means tending to restore it to initial position, and means controlled by said handle for connecting and disconnecting said feed and measuring members and permitting restoration of the measuring member.

5. In a feeding and measuring device, the combination of a feed member, means for operating the same, a measuring member having means for driving it from said operating means for the feed member and embodying means for limiting the extent of operation of the feed member, means operative to restore the measuring member to initial position after each measuring operation, and a device controlled by the operating means for the feed member to permit restoration of the measuring member.

6. In a feeding and measuring device, the combination of a feed shaft, a handle for operating it, a rotatable measuring member having an adjustable stop coöperative therewith, and a clutch having means for controlling it by said handle for connecting and disconnecting the measuring member with respect to the feed shaft.

7. In a feeding and measuring device, the combination of a feed shaft, a measuring member having means for driving the same from said shaft, a clutch on the feed shaft operative to connect and disconnect the measuring member with respect thereto, and a handle embodying means for controlling said clutch and for operating the feed shaft.

8. In a feeding and measuring device, the combination of a feed shaft, a measuring member coöperative therewith and having means for limiting the extent of operation of said shaft, means for restoring the measuring member to initial position after each measuring operation, a clutch movable axially on the feed shaft for connecting and disconnecting the measuring member with respect thereto, means for normally holding said clutch in engaged condition, and a hand is connected to said clutch to control the same and also connected to the feed shaft to operate it.

9. In a feeding and measuring device, the combination of a feed shaft, a measuring member adapted to be driven therefrom and embodying means for limiting the extent of operation of the feed shaft, a clutch capable of connecting and disconnecting the measuring member with respect to said shaft, means for holding said clutch in engaged condition, means for controlling said clutch and for operating the feed shaft, and a device for locking the clutch in disengaged condition.

10. In a feeding and measuring device, the combination of a feed member, a rotatable measuring member driven therefrom and carrying a controlling projection, a relatively fixed stop coöperative with said controlling projection to set the measuring member in initial position, and a relatively adjustable arm for limiting the degree of movement of the measuring member.

11. In a feeding and measuring device, the combination of a feed member, a rotatable measuring member having means for actuating it from said feed member and carrying a controlling projection, a relatively fixed limiting stop for setting the measuring member in initial position, an adjustable arm rotatable about the axis of movement of the measuring member for controlling the extent of movement of the latter, and means for locking said arm in different adjusted positions.

12. In a feeding and measuring device, the combination of a feed member, a rotatable measuring wheel having means for operating it from said feed member, the measuring wheel carrying a controlling projection, a limiting stop coöperative with said controlling projection for setting said wheel in initial position, a rotatable arm coöperative with said controlling projection to limit the extent of movement of the measuring wheel, a handle for adjusting said arm, a device for locking said handle in different adjusted positions, and a part carried by said handle and operative to control said locking device and to adjust said handle.

13. In a feeding and measuring device, the combination of a feed shaft, a gear and clutch member loosely mounted thereon, a measuring wheel coöperative with said gear and embodying means for controlling the extent of operation of said shaft, a spring operative to restore the measuring wheel to initial position, a second clutch member movable axially on the feed shaft for connecting and disconnecting the gear and clutch member first mentioned to said shaft, and a handle fixed to the second clutch member for controlling the latter and having a spline connection with the feed shaft for operating it.

14. In a feeding and measuring device, the combination of coöperative feed rolls, a feed shaft operatively connected thereto, a measuring device and coöperative means for limiting the extent of operation of the feed shaft, means operative to restore the measuring device to initial position, means embodying a clutch for connecting and disconnecting the measuring device with respect to the feed shaft, and a handle embodying means to control said clutch and to operate the feed shaft.

In testimony whereof I have hereunto set my hand in presence of two subscribing witnesses.

WILLIAM R. SCHWAB

Witnesses:
 AMBROSE L. PODKS,
 ISAAC E. YOUNG.